United States Patent
Visneski et al.

(10) Patent No.: US 7,889,757 B2
(45) Date of Patent: *Feb. 15, 2011

(54) METHOD AND APPARATUS OF PREVENTING PHYSICAL LAYER FROM ESTABLISHING UNSUPPORTED LINKS

(75) Inventors: Jason R. Visneski, San Jose, CA (US); Chris Desiniotis, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 12/102,437

(22) Filed: Apr. 14, 2008

(65) Prior Publication Data

US 2008/0192743 A1 Aug. 14, 2008

Related U.S. Application Data

(63) Continuation of application No. 10/460,939, filed on Jun. 12, 2003, now Pat. No. 7,373,421.

(51) Int. Cl.
*H04L 12/42* (2006.01)
*G06F 15/16* (2006.01)

(52) U.S. Cl. .................. 370/450; 370/255; 370/377; 370/395.4; 370/395.42; 370/457; 709/237

(58) Field of Classification Search .................. 370/230, 370/230.1, 241, 247, 251, 254, 255, 351, 370/359, 375, 377, 395.4, 395.42, 419, 450, 370/457, 517, 519; 709/220, 221, 222, 227, 709/228, 237, 250; 714/742

See application file for complete search history.

(56) References Cited

U.S. PATENT DOCUMENTS

| | | | |
|---|---|---|---|
| 6,052,380 A | 4/2000 | Bell | |
| 6,490,297 B1 * | 12/2002 | Kraml et al. | 370/522 |
| 6,788,508 B2 | 9/2004 | Papallo et al. | |
| 6,898,185 B1 * | 5/2005 | Agazzi et al. | 370/241 |
| 6,928,106 B1 * | 8/2005 | Agazzi | 375/219 |
| 7,373,421 B1 * | 5/2008 | Visenski et al. | 709/237 |
| 7,443,910 B2 * | 10/2008 | Agazzi | 375/219 |
| 2002/0157030 A1 | 10/2002 | Barker et al. | |
| 2004/0030977 A1 | 2/2004 | Jiang et al. | |
| 2006/0184698 A1 | 8/2006 | Conley et al. | |

* cited by examiner

*Primary Examiner*—Pankaj Kumar
*Assistant Examiner*—Mark A Mais
(74) *Attorney, Agent, or Firm*—Weaver Austin Villeneuve & Sampson LLP

(57) ABSTRACT

Methods and apparatus for preventing unsupported links between a host device and a link partner over a network is disclosed. In one embodiment, a link control signal is employed to release the reset of the candidate PHY, place a candidate PHY of the host device in a boot state, determining whether the candidate PHY is fully functional, and release the candidate PHY to establish link with the link partner over the network.

27 Claims, 4 Drawing Sheets

METHOD AND APPARATUS OF PREVENTING PHYSICAL LAYER FROM ESTABLISHING UNSUPPORTED LINKS

CROSS-REFERENCE TO RELATED APPLICATIONS

This application is a continuation of co-pending U.S. patent application Ser. No. 10/460,939, filed Jun. 12, 2003, the entirety of which is incorporated by reference as if set forth herein.

BACKGROUND

1. Field of the Disclosure

The disclosure relates generally to data communications, and in particular, to Ethernet applications.

2. The Prior Art

With the proliferation of Internet-aware appliances, more and more devices may be coupled to the same network, many with customized applications embedded therein.

While PHYs are typically shipped to boot into a default state, these devices may be customized with onboard software to provide enhanced functionality and therefore may boot into a non-standard state.

In network systems, typically the PHY is responsible for establishing a link, and will begin the link process immediately after being released from reset. However, at this point, any customized software present may not be fully functional, even though the PHY is attempting to establish contact over the host network.

FIG. 1 illustrates this process. In act 10, the PHYs reset is released, and enters a programming state in act 15. The PHY simultaneously moves to establish link partners in act 20. Typically, act 20 may finish in advance of act 15.

As can be seen, a non-functional PHY may prematurely appear on the network, with other link partners believing it is a functional link while the programming state is still being performed, resulting in problematic links. Furthermore, the customized software may be programmed to configure the PHY or perform diagnostic tests on the system or network, possibly resulting in a negative impact on link partners.

BRIEF DESCRIPTION OF THE DRAWING FIGURES

DETAILED DESCRIPTION

Figure 1:
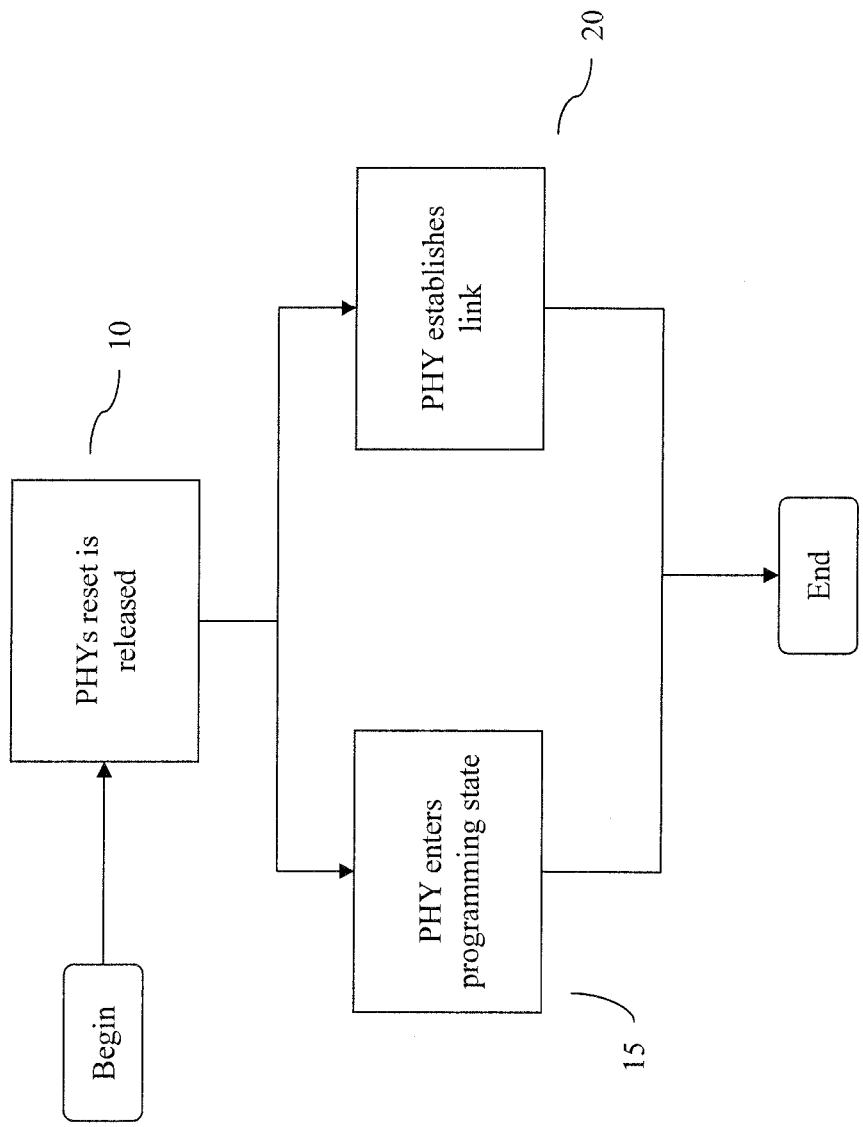
FIG. 1 is a flow block diagram of a method of PHY operation in prior art devices.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein.

Accordingly, the representation of various aspects of the present disclosure through the use of flowcharts should not be used to limit the scope of the present disclosure.

Figure 2:
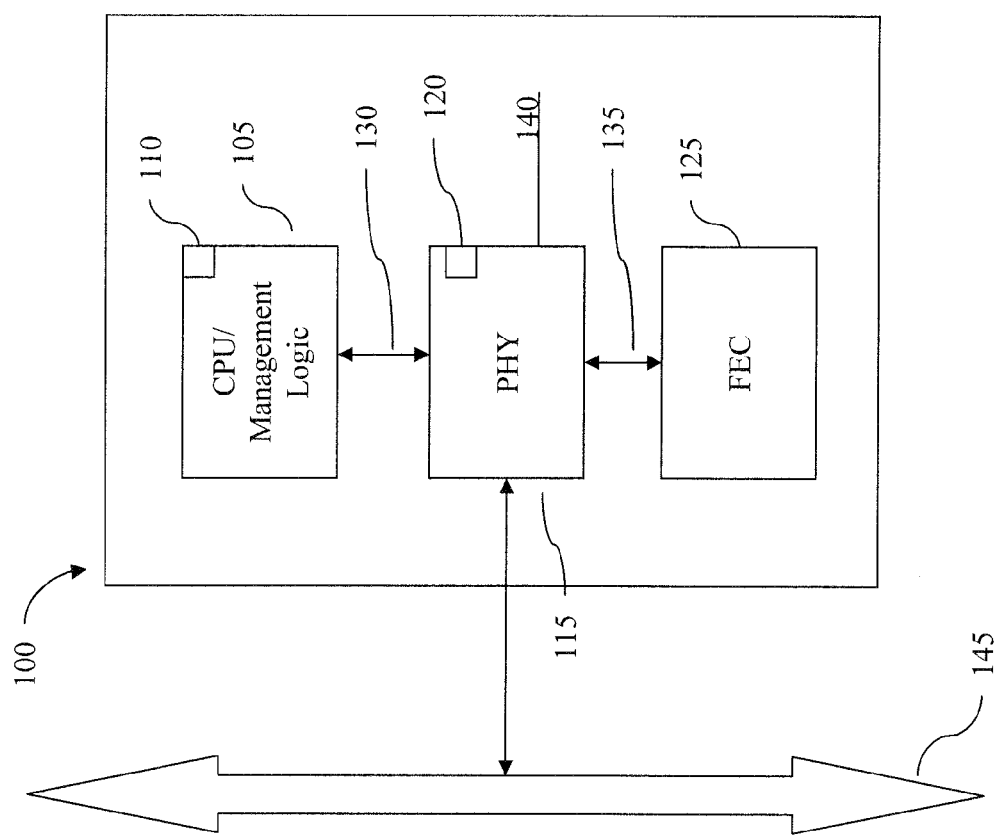
FIG. 2 is a conceptual block diagram of a host device configured in accordance with the teachings of this disclosure.

FIG. 2 is a conceptual block diagram of a host device 100 configured in accordance with the teachings of this disclosure. It is contemplated that a wide variety of host devices may be configured with the benefits of this disclosure, including any device capable of interfacing with an Ethernet-compliant medium 135. Examples of such devices include routers, switches, computers, peripherals, printers, and other such devices.

The host device 100 may include a CPU/Management Logic module 105 configured to control and operate the device. The CPU 105 may also include memory or other storage media 110 for storage and retrieval of embodiments of this disclosure.

The CPU 105 may be operatively coupled to a physical layer device 115, commonly referred to as a PHY, through a bus 130. It is contemplated that any PHY capable of being employed as a Ethernet transceiver may be employed in this disclosure. It is to be understood that any number of PHYs may be resident in the host device 100. The PHY 115 may include a processor 120 and associated memory as is known in the art to store, retrieve, and process embodiments of this disclosure.

It is contemplated that the bus 130 may include a wide variety of signals relating to the global function of the device, including such signals as a reset signal, a two-line signal known as a Management Data I/O (MDIO) bus, a power-on signal, and other such signals.

The PHY 115 may be coupled to a Fast Ethernet Controller 125 through an interface 135, such as a Media Independent Interface (MII) as is known in the art.

The PHY 115 is further configured to receive an additional link control signal 140, referred to herein as a Do Not Establish Link/OK to Establish Link signal, or link control signal for short. The link control signal 140 is used as disclosed herein to prevent a candidate PHY from establishing an unsupported link to a link partner through media 145. A candidate PHY is defined herein as a PHY that is attempting to establish a link through media 145, but has not yet done so, or is going through the process of rebooting after a reset or power-on sequence.

The operation of a PHY configured in accordance with this disclosure will now be disclosed.

Figure 3:
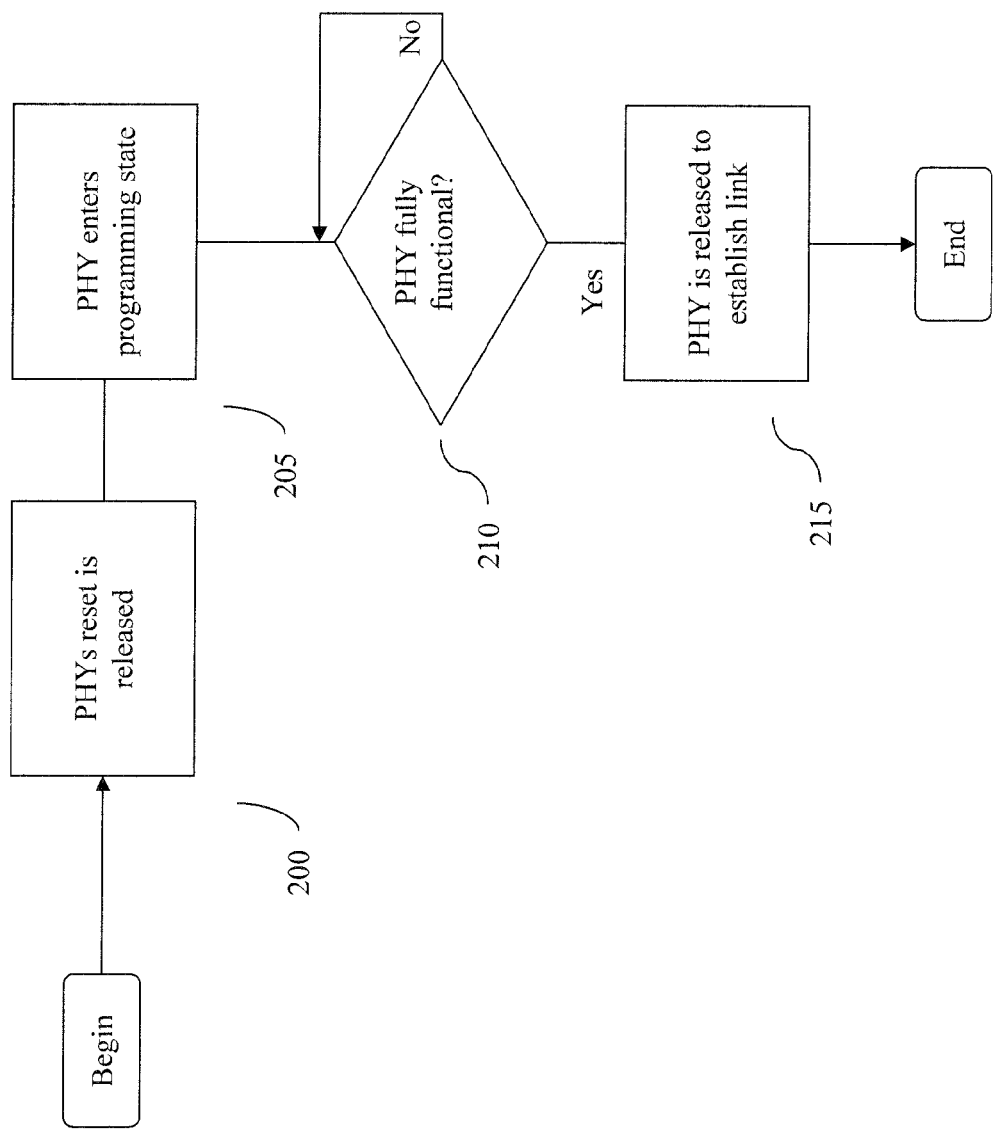
FIGS. 3 and 4 are flow block diagrams of disclosed methods for preventing unsupported links in accordance with the teachings of this disclosure.

Referring now to FIG. 3, a flow diagram of one disclosed embodiment of a method of preventing unsupported links is shown.

In act 200, the reset signal for the candidate PHY is released. The process then moves to act 205, where a candidate PHY has been placed in a boot sequence. It is contemplated that this may occur through any manner of ways, such as through a power-on sequence, a host device reset, or a user-initiated reset process. At this point, the link control signal is also placed in a Do Not Establish Link state.

As will be appreciated by those of ordinary skill in the art, normally at this point the candidate PHY will also attempt to establish a link with a link partner. However, in this disclosure the process moves to act 210, where the device determines whether the PHY is fully functional.

When the candidate PHY is determined to be fully functional, the process moves to act 215, where the link control line is placed in an OK to Establish Link state, releasing the candidate PHY to safely form a link with a link partner.

As will be appreciated by those skilled in the art, through the benefit of this disclosure the candidate PHY is allowed to move to a fully functional state prior to establishing a link, with the link control signal being maintained in a Do Not Establish Link state by the host device. Hence, through the use of the link control signal, the PHY of this disclosure is prevented from establishing a link until it is fully functional.

As will be appreciated by those of ordinary skill in the art, the host device 100 may perform power-on processing, such as PHY programming and network testing, without the possibility of unsupported links being established. It is contemplated that any number of PHYs present in the host system may be controlled using the benefits of this disclosure.

It is contemplated that the link control status of this disclosure may be implemented in a PHY through different means. For example, as illustrated in FIG. 2, the link control signal may be operated under external control, such as by the host device.

Alternatively, the link control status may be available internal to the PHY, such as through the use of internal memory registers that may be configured to indicate when the PHY is fully functional and prepared to establish link. In this embodiment, the link control status of the PHY may be polled and controlled through the use of the MDIO bus.

As will be appreciated, typically it is the host CPU that determines whether it is proper to establish link using the teaching of this disclosure. Hence, using the benefits of this disclosure, link control may be implemented in a variety of ways including a link control signal or accesses through MDIO or equivalent control bus to internal registers.

Furthermore, to insure that PHYs configured in accordance with this disclosure are backward-compatible, the link control function may be available via a pin on the IC package in which the PHY is provided. For customers who wish the PHY to be immediately available to establish link, the pin may be strapped in an OK to Establish Link state using means well known in the art.

Figure 4:
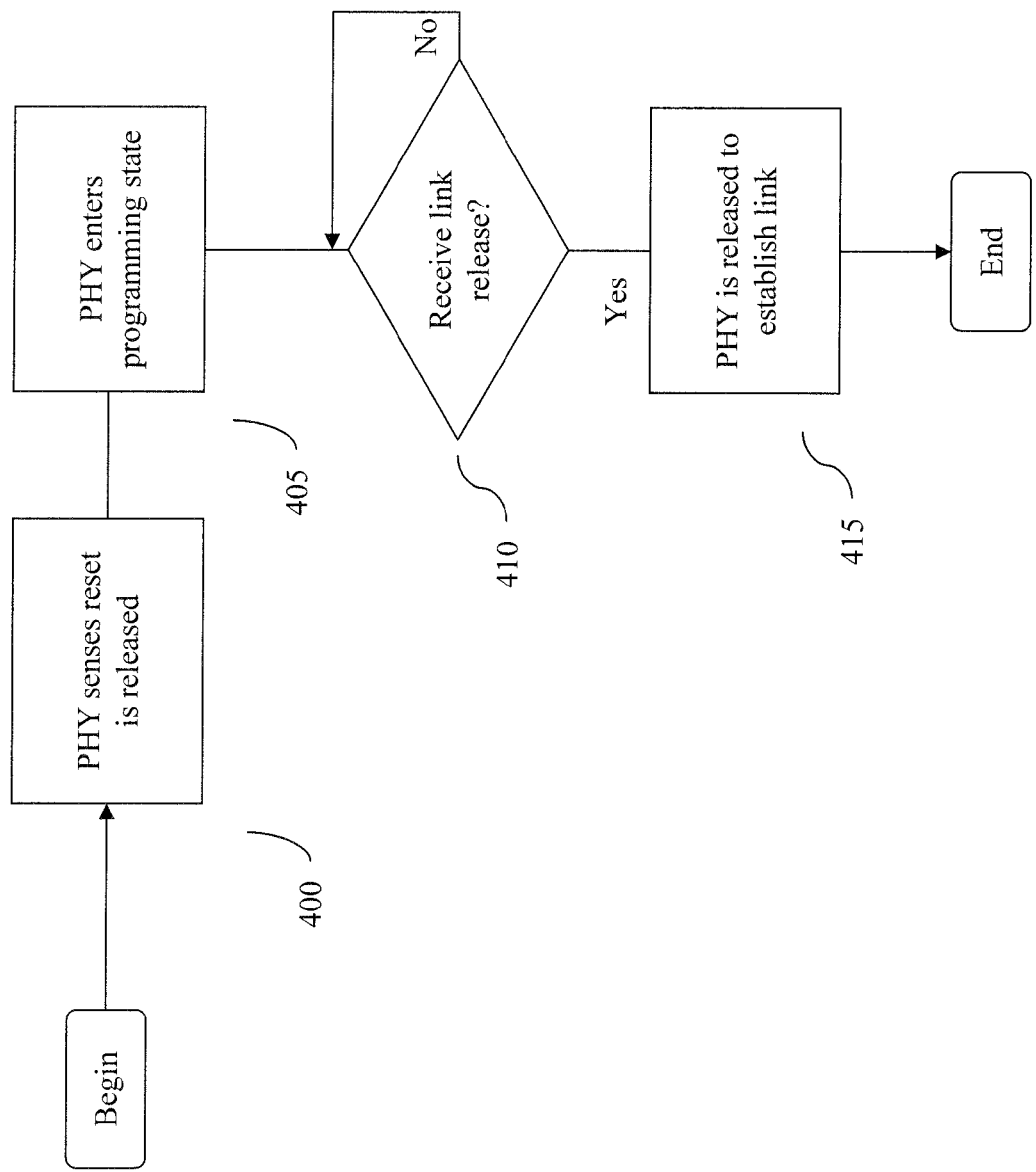

FIG. 4 is a flow diagram of a further disclosed method from the PHY's perspective. In FIG. 4, the PHY may sense that its reset has been released in act 400, then moving to a programming state in act 405. In act 410, the PHY is configured to wait for an indication from the host device that the PHY may move to establish link with a link partner. If no indication is sensed by the PHY, the PHY may loop and wait as shown by query 415. Once an indication is received, such as an OK to Establish Link indication, the process may move to act 415, where the PHY may safely establish link with a link partner.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method, comprising:
   detecting a reset of a physical layer device (PHY) of a device;
   placing the PHY in a programming state in response to detecting the reset of the PHY of the device;
   determining whether the PHY is fully functional; and
   releasing the PHY to establish a link with a link partner over a network in accordance with the determination of whether the PHY is fully functional, thereby ensuring that the PHY is not released to establish a link with a link partner until the PHY is no longer in the programming state.

2. The method as recited in claim 1, wherein the PHY is a candidate PHY.

3. The method as recited in claim 1, wherein determining whether the PHY is fully functional comprises:
   detecting a state of a link control signal.

4. The method as recited in claim 1, wherein releasing comprises:
   placing a link control signal in a first state, enabling the PHY to establish a link with a link partner over the network.

5. The method as recited in claim 4, wherein placing the link control signal in the first state is performed in response to an external control that is external to the PHY.

6. The method as recited in claim 4, wherein placing the link control signal in the first state is performed in response to a control internal to the PHY, wherein the control internal to the PHY is configured to indicate when the PHY is fully functional.

7. The method as recited in claim 4, wherein the first state is an OK to establish link state.

8. The method as recited in claim 7, wherein placing the link control signal in the first state comprises:
   changing the link control signal from a do not establish link state to the OK to establish link state.

9. The method as recited in claim 1, further comprising:
   placing a link control signal in a do not establish link state, thereby preventing the PHY from establishing a link until the PHY is fully functional.

10. The method as recited in claim 9, wherein placing the link control in the do not establish link state is performed after the PHY is placed in the programming state.

11. The method as recited in claim 1, further comprising:
   polling a link control status of the PHY, the link control status preventing the PHY from establishing a link when in a first state, and enabling the PHY to establish a link when in a second state.

12. The method as recited in claim 11, wherein polling is performed via a Management Data I/O bus.

13. The method as recited in claim 1, further comprising:
   controlling a link control status of the PHY, the link control status preventing the PHY from establishing a link when in a first state, and enabling the PHY to establish a link when in a second state.

14. The method as recited in claim 13, wherein controlling is performed via a Management Data I/O bus.

15. The method as recited in claim 1, wherein the reset is initiated via a power-on sequence.

16. The method as recited in claim 1, wherein the reset is initiated by the device.

17. The method as recited in claim 1, wherein the reset is initiated via a user-initiated reset.

18. The method as recited in claim 1, wherein placing the PHY in a programming state comprises placing the PHY in a boot sequence.

19. The method as recited in claim 1, wherein determining whether the PHY is fully functional comprises:
determining whether the programming state is completed.

20. The method as recited in claim 1, further comprising:
releasing the reset of the PHY.

21. The method as recited in claim 1, wherein detecting a reset of a physical layer device (PHY) comprises:
sensing a release of the reset of the PHY.

22. The method as recited in claim 1, wherein determining whether the PHY is fully functional is performed when the PHY is in the programming state.

23. An apparatus, comprising:
a processor; and
a memory, at least one of the processor or the memory being adapted for:
detecting a reset of a physical layer device (PHY);
placing the PHY in a programming state in response to detecting the reset of the PHY of the device;
determining whether the PHY is fully functional; and
releasing the PHY to establish a link with a link partner over a network in accordance with the determination of whether the PHY is fully functional, thereby ensuring that the PHY is not released to establish a link with a link partner until the PHY is no longer in the programming state.

24. The apparatus as recited in claim 23, wherein the PHY is configured to receive a link control signal, wherein releasing the PHY to establish a link with a link partner over the network comprises:
placing the link control signal in an OK to establish link state when it is determined that the PHY is fully functional.

25. The apparatus as recited in claim 24, wherein the link control signal is initialized to a do not establish link state.

26. An apparatus, comprising:
means for detecting a reset of a physical layer device (PHY) of a device;
means for placing the PHY in a programming state in response to detecting the reset of the PHY of the device;
means for determining whether the PHY is fully functional; and
means for releasing the PHY to establish a link with a link partner over a network in accordance with the determination of whether the PHY is fully functional, thereby ensuring that the PHY is not released to establish a link with a link partner until the PHY is no longer in the programming state.

27. A method, comprising:
detecting a reset of a physical layer device (PHY) of a device;
placing the PHY in a programming state in response to detecting the reset of the PHY of the device;
determining whether the PHY is fully functional; and
releasing the PHY to establish a link with a link partner over a network in accordance with the determination of whether the PHY is fully functional, thereby ensuring that the PHY is not released to establish a link with a link partner until the PHY is no longer in the programming state, wherein a control internal to the PHY is configured to indicate when the PHY is fully functional.

* * * * *